(12) United States Patent
Lempicki et al.

(10) Patent No.: US 6,967,330 B1
(45) Date of Patent: Nov. 22, 2005

(54) HIGH-DENSITY POLYCRYSTALLINE LUTETIUM SILICATE MATERIALS ACTIVATED WITH CE

(75) Inventors: Alex Lempicki, Boston, MA (US); Charles Brecher, Lexington, MA (US); Helmut Lingertat, Boston, MA (US); Vinod K. Sarin, Brookline, MA (US)

(73) Assignee: ALEM Associates, Boston, MA (US)

( * ) Notice: Subject to any disclaimer, the term of this patent is extended or adjusted under 35 U.S.C. 154(b) by 0 days.

(21) Appl. No.: 10/835,679

(22) Filed: Apr. 30, 2004

Related U.S. Application Data

(60) Provisional application No. 60/470,622, filed on May 15, 2003.

(51) Int. Cl.[7] ................................................ G01J 1/00
(52) U.S. Cl. ................................................. 250/361 R
(58) Field of Search ................................... 250/361 R
(56) References Cited

U.S. PATENT DOCUMENTS

| | | | |
|---|---|---|---|
| 4,883,956 A | 11/1989 | Melcher et al. | .......... 250/269.2 |
| 4,958,080 A | 9/1990 | Melcher et al. | .......... 250/483.1 |
| 5,116,560 A * | 5/1992 | Dole et al. | .................. 264/1.22 |
| 5,296,163 A * | 3/1994 | Leppert et al. | ....... 250/301.4 S |
| 5,484,750 A | 1/1996 | Greskovich et al. | .......... 501/86 |
| 5,562,860 A | 10/1996 | Grabmaier et al. | ... 252/301.4 S |
| 6,392,236 B1 | 5/2002 | Maekawa et al. | ........... 250/372 |
| 2002/0153492 A1 * | 10/2002 | Sekine et al. | .......... 250/370.11 |

OTHER PUBLICATIONS

D.G. Anderson et al., "Glass scintillators for the Detection of Nuclear Radiations", Proc. 5th Intl. Instru. & Meas. Conf., Stockholm, pp. 616-630, 1960.

A.D. Bross, "Properties of new Scintillator Glasses and Scintillating Fibers", Nucl. Intr. & Meth. A247, 319-326, 1986.

W.W. Moses et al., "Scintillators for Positron Emission tomography", Proc. Intl. Conf. on Inorganic Scintillators, SCINT95, Delft University Press, the Netherlands, 1996.

W.W. Moses et al., "Internet Access to Data for Scintillation Compounds", Proc. Intl. Conf. On Inorganic Scintillators, SCINT95, Delft University Press, the Netherlands, pp. 525-527, 1996.

C. Melcher et al., "Scintillation Properties of LSO:Ce Boules", IEEE Trans. Nucl. Sci, 17, 956-968, 2000.

C. Melcher et al., "Advances in the Scintillation Performance of LSO:Ce Single Crystals", IEEE Trans. Nucl. Sci Symposium and Medcial Imaging Conf., 17: 956-968, 2002.

Y. Ito et al., "Hot Isostatic Pressed $Gd^2O^2S$:Pr, Ce, F Traslucent Scintillator Ceramics for X-Ray Computed Tomography Detectors", Journal of Applied Physics, 27: L1371-L1373, Japan, 1988.

G.F. Knoll et al., "Radiation Detection and Measurement", John Wiley & Sons, NY, ppgs. 8, 1979.

* cited by examiner

Primary Examiner—David Porta
Assistant Examiner—Marcus Taningco
(74) Attorney, Agent, or Firm—Brown Rudnick Berlack Israels LLP

(57) ABSTRACT

This invention encompasses the oxides of lutetium and silicon in various proportions and containing a dopant, optionally cerium, fabricated in the form of a translucent ceramic, and methods of manufacture and use of such ceramic.

28 Claims, 8 Drawing Sheets

=M ALEM ALEM ALEM  
1 ALEM ⬤M ALEM  
ALEM ⬤ ALEM  
\LEM A⬤M ALEM 
_EM ALEM ALEN

HIGH-DENSITY POLYCRYSTALLINE LUTETIUM SILICATE MATERIALS ACTIVATED WITH CE

CROSS REFERENCE TO RELATED APPLICATIONS

This application is claims benefit from U.S. Provisional Patent Application No. 60/470,622, filed May 15, 2003, which is hereby incorporated by reference.

GOVERNMENT INTERESTS

This invention was made with the government support under Grant 9 R44 EB3000826-02 and the government may hold rights therein.

FIELD OF THE INVENTION

This invention encompasses high-density polycrystalline materials based on the oxides of lutetium and silicon in various stoichiometric proportions, as exemplified by the oxyorthosilicate $Lu_2SiO_5$ ("LSO") and the pyrosilicate $Lu_2Si_2O_7$ ("LPS") and mixtures thereof, with a dopant, optionally cerium, and methods of manufacture and use.

BACKGROUND OF THE INVENTION

Digital X-ray has the potential to overcome limitations of screen-film systems, including higher detection efficiency, significantly wide dynamic range, contrast enhancement, and post processing capabilities such as computer-aided diagnosis and web base instantaneous access to the images by multiple expert radiologists. Furthermore, digital data acquisition enables the exploration of novel imaging techniques such as tomosynthesis, dual energy X-ray, and digital subtraction imaging. CT and PET scans are also well known X-ray techniques. Advancements in technology in the past decade have now made it feasible to obtain large area high-quality images using digital detectors. These utilize a scintillator as the primary detection layer to convert X-rays to light. This light is subsequently converted into an electronic signal by various photoelectric sensors such as charge-coupled devices ("CCDs") and amorphous silicon photodiodes (a-Si:H). Results from clinical trials suggest that in static imaging, digital methods give results comparable to photographic film. In methods that rely on photon counting (such as computerized tomography (CT) or positron emission tomography (PET), film has no application. Both of these methods can benefit from the development of efficient, fast and economical converters of X-rays to electrical signals. One category of such converters is called scintillators, which convert X-ray photons to visible light photons, subsequently detected by photomultipliers or solid-state devices.

Scintillators are generally made from single crystals. Relevant examples are the two lutetium silicate compounds (ortho- and pyro-) mentioned above, to which cerium has been added as a dopant to provide the desired emission. Some materials, however, are not readily grown as single crystals, either because of their extremely high melting points or because they decompose before melting. Relevant examples are lutetium oxide and gadolinium oxysulfide (GOS), respectively. In such cases it is sometimes possible to prepare the scintillator from sintered powders. Conventional wisdom views such powder consolidation techniques as merely a last resort, and the product as less than adequate approximations to the ideal. According to this view, there is no reason to fabricate a scintillator as a ceramic when the material is already available as a single crystal. As will be seen, however, this invention contravenes conventional wisdom, and demonstrates that the lower fabrication temperatures can improve some of the scintillation properties of the ceramic to be actually superior to those of a single crystal of the same composition.

SUMMARY OF THE INVENTION

This invention comprises materials to be used for detection of ionizing radiation (X-rays or gamma), comprised of polycrystalline bodies containing lutetium, silicon, and oxygen in various stoichiometric proportion, such as $Lu_2SiO_5$ (LSO) or $Lu_2Si_2O_7$ (LPS), as well as mixtures thereof, doped with cerium as a luminescent activator. Optionally, other dopants are Pr, Nd, Sm, Eu, Gd, Th, Dy, Ho, Er, Tm, Yb, optionally in the 3+ charge state. The polycrystalline bodies, prepared at high temperatures with negligible porosity, are commonly called ceramics, and this is the term we shall use henceforth. Ceramics made from pure compounds (LSO and/or LPS) have the same chemical composition and essentially the same density (at least about 99%) as the respective single crystal forms (LSO:Ce or LPS:Ce) in current use for radiation detection. In the case of mixed LSO/LPS ceramics the density will be determined by the relative percentages of the constituent compounds. In some embodiments the concentration of dopant is between 0.01% and 1%, or about 5% of the content of lutetium. Note is made of LSO:dopant where the ceramic is prepared by consolidation of a powder having the same elemental composition as single crystal LSO:dopant (e.g., LSO:Ce) scintillator, that is, the same proportion of chemical elements in the form of binary oxides.

In particular embodiments, the ceramics of this invention are prepared by the process of consolidation of a powder having the same chemical composition; i.e., for LSO:Ce, having the chemical formula $(Lu_{(1-x)}Ce_x)_2SiO_5$, for LPS:Ce $(Lu_{(1-x)}Ce_x)_2 Si_2O_7$, where x is a fraction having the same value as in the single crystal LSO:Ce or LPS:Ce scintillator. Usefully, consolidation is accomplished by sintering in vacuum or other inert atmosphere, at temperatures between about 10 and about 300 degrees C. below the respective melting points (2070 C for LSO and 1900 C for LPS). In specific embodiments the consolidation is assisted by the imposition of mechanically generated uniaxial pressure between 1000 and 50000 psi, at temperatures of about 900° C. or higher. In other embodiments consolidation is assisted by the imposition of isostatic pressure as transmitted by an inert pressurized fluid, at pressures between about 1,000 and about 50,000 psi, at temperatures between about 200 and about 1200 C below the melting point of the relevant stoichiometric compound. Combinations of the above processing in the form of sinter-HIP processing is also noted.

This invention yet further comprises processing after consolidation wherein the ceramic is heated in air at a temperature between about 800 and about 1500° C. for about one hour or sufficient to restore its stoichiometry; i.e., to replenish any oxygen lost by chemical reduction during consolidation.

Particularly within the present invention is the ceramic material of the above-noted processing steps having a transparency of the ceramic at a wavelength of 420 nm for LSO and 385 nm for LPS, maximized by enhancing grain growth during consolidation to an average size greater than about 5 $\mu$m.

Also particularly within the present invention is the ceramic material of the above-noted processing steps having a transparency of the ceramic at a wavelength of 420 nm for LSO and 385 nm for LPS, maximized by restricting grain growth during consolidation to an average size less than about 0.8 μm.

Specific attention is drawn to ceramics processed as noted above wherein the detectable light signal emerging from a specimen 1 mm thick, whether achieved by small or large grains, under excitation by 150 kVp X-rays is at least about 50% of that emerging from a specimen of the same dimensions of $Gd_2O_2S$:Pr ceramic, as presently used in X-ray computerized tomography applications.

The invention additionally includes the material processed as noted above wherein the light yield from a specimen 1 cm thick, whether achieved by small or large grains, under excitation by 511 keV gamma rays is at least about 50% of a comparable specimen of LSO:Ce single crystal, particularly as used in positron emission tomography (PET) applications.

DETAILED DESCRIPTION OF THE INVENTION

Figure 1:
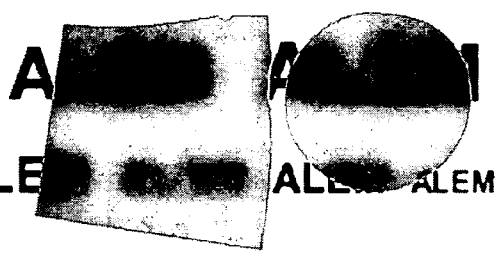
FIG. 1 illustrates two partially transparent lutetium silicate ceramics: (a) shows a ceramic of LSO, (b) compares a ceramic of LPS (right) with one of GOS (left).

This invention will be better understood with reference to the following definitions:

A. Host lattice means the crystalline compound from which the ceramic is made. In the case of LSO, this compound is $Lu_2SiO_5$. In the case of LPS the compound is $Lu_2Si_2O_7$.

B. Absence of pores or void-free means that the volume of unfilled space within a crystal or ceramic (pores) is substantially less than about 0.1% of the total volume.

C. Anisotropy shall mean that characteristic velocity of light transmission varies with direction of travel through a crystal.

D. Transparency shall refer to the fraction of the light that is incident upon one surface of a specimen that passes unchanged through a given thickness and emerges from the opposite side.

E. Ceramic mean a solid body that has been formed by compacting powder under thermo-mechanical conditions capable of causing sufficient atomic interchange between the granules for them to fuse together without melting. The resulting body reaches a density at least about 99.8% and particularly at least about 99.9% of the crystalline value. At room temperature, powder that has been mechanically compacted even at extremely high pressures does not fuse, and rarely reaches a density higher than about 50% of single crystal density. Better ceramics are those with greater than about 99.9% of crystalline density.

F. Sintering shall mean forming a coherent mass from a loose powder by heating without melting. Depending on conditions, the density of the resultant mass may reach that of the single crystal.

G. Decay time shall mean the negative inverse of the slope of a logarithmic plot of the fluorescence decay. The initial value of this quantity is essentially mandated by the spectroscopic properties of the activator; for LSO and LPS this is about 40 ns.

H. Afterglow or long-term persistence shall be understood to mean a slowly decaying background light emission that lasts for a much longer time than would be the case if it had been determined by the spectroscopic laws governing the decay of the activator. Without being bound by any particular theory, afterglow is generally attributed to excitation energy that has been stored in crystal defects and is being slowly released. Hence it depends very much upon the ambient temperature and the length and intensity of the preceding excitation. Under typical conditions prevalent in CT applications, a residual afterglow intensity less than about 0.01% of the steady state intensity at a time up to 20 ms after turn-off of X-ray excitation is suitable. This condition is a largely empirical limit based on image quality, and is a function of both the framing rate and the specific imaging technology.

I. LSO ceramic shall mean a ceramic of lutetium oxyorthosilicate, $Lu_2SiO_5$, LPS ceramic shall mean a ceramic of lutetium pyrosilicate, $Lu_2Si_2O_7$. LSO/LPS ceramic shall mean a ceramic consisting of a mixture of the two compounds.

J. Activation in reference to lutetium oxyorthosilicate (as a host) shall mean that an activator, also known as a dopant, has been introduced into the host lattice so as to produce emission of detectable light within a desired spectral wavelength upon excitation by X-ray or high-energy particle. In the context of the instant invention the preferred activator is $Ce^{3+}$. Other noted dopants are Pr, Nd, Sm, Eu, Gd, Th, Dy, Ho, Er, Tm, Yb, all of them in the 3+charge state.

K. Grain size can be calculated to sufficient accuracy from a microphotograph (SEM) of a ceramic surface. Straight lines emanating from one point are drawn in many directions and the distances between consecutive points where these lines intersect grain boundaries are measured, multiplied by the magnification factor, and statistically analyzed under the approximation of circular grains to extract an average grain "diameter".

L. Powder shall mean the fine particulate that is a typical product of firing and ball-milling solid crystalline material. This processing controls the particle size distribution and particle morphology, dispersion and deagglomeration. In some embodiments powder is used in prefabrication of a "green" body (often by cold-pressing) prior to the actual densification.

The consolidation of a powder into a ceramic is accomplished by a number of techniques. One of these is pressureless sintering, in which the driving force is the reduction of the total surface area. The temperature is raised high enough for material diffusion to take place, and the particles grow together, the larger ones at the expense of the smaller, until (ideally) all voids have diffused out of the object. In specific embodiments a "sintering aid" is added to the powder. Depending on the specific material, a sintering aid is believed to act either as a flux, promoting the mobility of the atoms of the primary material, or as a grain boundary pinning agent, lowering the growth rate of the grains so as to prevent the entrapment of voids within the densifying body. Application of pressure assists the densification, enabling it to occur at lower temperatures than by sintering alone.

In some embodiments uniaxial pressure between about 1000 and about 50000 psi is applied mechanically (hot pressing), or by a pressurized fluid (hot isostatic pressing, commonly called HIPing). HIPing requires the step of sealing the surface against the pressure-transmitting fluid. Among a number of options, sealing is achieved by encapsulation or by appropriate thermal treatment of the surface (sinter-HIPing). Uniaxial pressure normally ranges between about 1000 and 50000 psi.

M. Monoclinic C structure in relation to LSO and LPS shall mean a lattice structure of three unequal crystal axes, two of which intersect obliquely and are perpendicular to the third. "C" designates a lattice system with additional points at the centers of the faces perpendicular to the c axis.

N. Oxygen vacancies shall mean sites in the lattice at which oxygens are normally located, but, for chemical or thermodynamic reasons, are missing. It is noted that oxygen vacancies occur even in perfect crystals because their presence is determined by the thermodynamic properties of the lattice at temperature T at which the crystal was formed. The minimum concentration is very strongly dependent on T, being proportional to $\exp(-1/T)$. However this native concentration can be significantly exceeded by various irradiations or by chemical means. The vacancies are not directly observed. Since they have a tendency to bind electrons they give rise to so-called F-centers, which impart a strong coloration to an otherwise colorless crystal. In specific embodiments of the present invention the concentration of native oxygen vacancies is significantly lower than in crystals grown from the melt because hot pressing is performed at temperatures as much as 600 to 800 C below the melting point, which are 2070 C for LSO and 1900 C for LPS. In other embodiments, however, the particular conditions of hot pressing, such as presence of graphite dies or heating elements, increase the concentration of vacancies by chemical reduction. Often hot pressed the samples are very strongly colored. The color is usefully bleached. One method of bleaching is by heating in air at temperatures on the order of 1100 C. for about 2 to 6 hours. The bleaching is due to the replenishment of oxygen in the anomalously high concentration of vacancies.

O. Light output is stated in relation to the energy of the ionizing photon that has been absorbed, and is expressed in terms of photons/MeV. Measurement of this quantity is usefully accomplished by counting the numbers of photons of visible light generated in the scintillator as it converts ionizing particles (most usually in medical applications X-ray or gamma photons) emitted by an appropriate source, first into electrons, which subsequently excite luminescent ions such as $Ce^{3+}$ in the present case. Substantially each scintillation pulse is recorded on a multichannel analyzer, where the channel number is directly proportional to the number of photons that have been generated in that particular event. The most efficient events are those in which the entire energy of the ionizing particle has been converted to photons of visible light, with none diverted to less productive processes. This represents the greatest number of visible photons that can be created by a single event, and is recorded as a so-called photopeak or total energy peak. Comparing its position with that of a standard material such as BGO, whose light output (8200 photons/MeV) is established, yields a value for the light output of the scintillator in question. For PET the light output of BGO is a base line, which all other candidate materials should exceed. For a reliable measurement of light output, note that the ionizing photons should have an energy such that most of the radiation is absorbed in the bulk of the scintillator. If their energy is too low, most excitation is absorbed just near the surface; if too high, most of them pass through without being absorbed at all.

P. Photopeak is a measure of those photons created directly by the conversion of the entire energy of the ionizing particle. Photons created by indirect processes (such as Compton scattering) are not counted within the photopeak even though such photons are a component of total emission intensity. The pulse height distribution mirrors the various processes that lead to the emission of luminescence photons, with their positions measuring the number of photons generated and their heights indicating their relative probabilities. The maximum number of photons per event corresponds to total absorption of the gamma or X-ray and the conversion of all its energy to scintillation radiation. This produces the photopeak or total energy peak, which provides a means of comparing the scintillation capabilities of different materials: Its position gives the light output (i.e. the maximum number of photons a material is capable of producing per unit of ionizing energy), while its height gives the energy resolution (i.e., the relative probability that a given scintillation event will actually generate this maximum, rather than a smaller number from less efficient processes). Indeed these less efficient processes, such as Compton scattering, may become so predominant that the photopeak becomes too broad to locate accurately, and in some cases disappears completely.

Q. Compton scattering, in the context of scintillators, occurs when a photon of ionizing radiation collides with an electron in the lattice but is not completely absorbed in the process. Instead, it undergoes inelastic scattering, changing its direction and depositing some but not all of its energy. The surviving photon consequently carries less energy than it had before the collision, and is characterized by a longer wavelength. The energy that it has deposited into the lattice does generate a scintillation pulse, but contains far fewer photons than in the full energy peak, and is therefore recorded at a much lower location in the energy spectrum. This phenomenon is called the Compton effect.

R. Scintillator shall mean any material that absorbs ionizing radiation and converts its energy into a burst of visible photons within a desired spectral range.

S. Scintillation shall mean detectable light resulting from an X-ray or other high-energy particles striking a scintillator.

T. Timing resolution is the property that defines the precision with which the arrival of two consecutive photons can be distinguished as two events.

Synthesis of the Precursor Powders

As indicated above, ceramics are generally synthesized from appropriately prepared powders having the necessary atomic composition. It is noted that the quality of the ceramic is strongly dependent on the quality of the precursor powder. In one embodiment, cerium-activated lutetium LSO and LPS powders were synthesized from the coprecipitated rare earth oxides. Preparation began by dissolving oxides of cerium and lutetium in nitric acid. After adjusting pH, an aqueous solution of oxalic acid added to the nitric acid solution and the resultant white precipitate was separated out. This precipitate was then mixed with silicic acid and an ammonium fluoride flux and heated in a furnace at 1250° C. for four hours to form the silicate powder.

In another embodiment, the LSO and/or LPS powder was synthesized by a flux-free process. This is useful for ceramic fabrication by the hot-pressing technique. In this process $Lu_2O_3$ and $SiO_2$ powders, in a 1-to-1 molar proportion are ball-milled in a methanol slurry in which $Ce(NO_3)_3$ has been dissolved, followed by firing at temperatures up to 1350 C to convert it to LSO.

LPS is prepared in an analogous manner, but starting with a 1-to-2 molar mixture of the oxides.

Although the absence of flux introduces the risk of incomplete reaction, ceramics hot-pressed from this powder have not shown signs of a second phase. In this process it is important to pay close attention to temperatures during ceramic fabrication such that temperatures are high enough to allow sufficient diffusion within the bulk.

LSO powder synthesized in both ways was analyzed by X-ray diffraction at Massachusetts Institute of Technology (Rigaku Rotaflex # RTP-500), along with ceramic specimens fabricated from them. The X-ray diffraction patterns of all these materials were essentially identical to that obtained from powder created by grinding a single crystal of LSO. This pattern is representative of the monoclinic C structure of LSO, and is also consistent with previously published data for LSO reported in *JCPDS* file 41-0239 (1989), the teachings of which are incorporated herein by reference. This conclusively demonstrates the chemical identity and phase purity of the LSO powders and ceramics.

Fabrication of Lutetium Silicate Ceramic

Without being bound by any particular theory, the fabrication of ceramics is driven by one fundamental thermodynamic fact: In all crystalline substances, any atom (or ion, or molecule) on the surface is in a less stable state than a corresponding one within the body of the crystal. Thus if the substance in a finely subdivided state (powder) is raised to a temperature high enough for material diffusion to take place, it will require less energy for material to leave a small particle than a large one. Then, if the particles are in close enough proximity, an essentially Darwinian process will take place: Since larger particles are thermodynamically more stable than smaller ones (i.e., have less surface area for the amount of material they contain), the larger particles will grow at the expense of the smaller ones, causing the latter (as well as the vacant space between them) ultimately to disappear. In some specific embodiments a "sintering aid" is added to the precursor powder. In principle, conditions for intergranular diffusion could be maintained until all material resided in the same single crystal (and indeed this can sometimes be accomplished), but the differential growth rate drops off so sharply with the surface-to-volume ratio as to make it impractical to go beyond a dense but polycrystalline body.

In practice, the consolidation can be accomplished as a strictly thermal process, relying on just the decrease of surface area as the driving force (termed direct or pressureless sintering), or it can be assisted by the imposition of external pressure, generally enabling it to occur at lower temperatures. The pressure can be transmitted mechanically (termed hot pressing), or through immersion in a highly pressurized fluid (termed hot isostatic pressing, or HIPing). The approach actually used in any specific case is generally made on the basis of desired secondary properties, such as mechanical strength, grain size, or light transmission.

In the fabrication of such a ceramic, consolidation generally begins with a cold pressing of the starting powder to reach at least 50% of theoretical (crystalline) density. This is an empirical lower bound for most ceramics, since lower values generally leave the average particle—particle distance too large for full consolidation to take place. We should note that the described cold pressing is merely a means to achieve the desired starting condition, and other means, such as tape-casting or injection molding, are not excluded. Thus one embodiment of the invention involves direct sintering, wherein the compacted powder is heated to a temperature between 1200 and 1900 C, in vacuum or highly diffusable gas such as $H_2$ or He. The rate of temperature rise and fall can be quite important, since the growth rate of the grains should be kept below the diffusion rate of the pores to prevent the latter from becoming entrapped within the former. For this particular example we will cite a linear ramp of 5 to 10 C per minute up and down, with a plateau of appropriate temperature (within the range stated above) for 2 to 10 hours. More complex patterns involving intermediate pauses are employed to tailor the grain size and light transmission.

Another ceramic fabrication technique employs hot pressing. Hot pressing involves the application of external mechanical pressure to assist in the consolidation, allowing densification to take place at lower temperatures with greater flexibility in terms of temperature and pressure. This technique works best for simple shapes (such as disks) and small sizes (on the order of centimeters in linear dimensions and millimeters in thickness); this is not an intrinsic limitation, but for larger and more complex shapes, with their increased risk of anisotropy, strain, and chemical contamination, HIPing becomes the technique of choice.

As an example of a particular embodiment, we describe the process for hot pressing an LSO ceramic; this description is valid for all of the claimed compositions, with only minor differences in specific conditions. To begin, approximately two grams of the starting powder was inserted into a ⅝ inch boron nitride washed graphite die. The ambient atmosphere was then fully evacuated and the temperature and mechanical pressure raised to 1400° C. and 6500 psi at a constant rate over a period on the order of 2 hours. This condition was maintained for 2 hours, followed by a relaxation of pressure and a return to ambient temperature (about 18–22 C) over approximately the same amount of time. The specimen was then post-heated to 1700 C to allow further grain growth, as explained earlier.

In some instances hot pressing can introduce defects not inherent in the chemical nature of the material. Without being bound by any particular theory, we note that, at the temperatures and vacuum under which the hot press operates, the graphite dies and heating elements create an extremely powerful reducing environment. This tends to draw oxygen out of the host lattice, producing oxygen vacancies that impart a body color to the resulting ceramic compact. This discoloration can be eliminated by heating the ceramic in air to replenish the missing oxygen, thereby restoring its stoichiometry. The X-ray diffraction pattern of the ceramic is virtually indistinguishable from that of pulverized single crystal, attesting to their identity in crystalline structure.

Yet a third approach for ceramic fabrication is hot isostatic pressing, commonly termed HIPing. It operates on the same basic principles as mechanical hot pressing, but differs significantly in the nature of the pressure and the manner in which it is applied. In this approach, the material to be consolidated is immersed in a chemically benign (non-reactive) fluid, which transmits the pressure to the specimen uniformly and without directional bias. This approach has two ancillary advantages, both offering higher pressure than is normally available mechanically and serving as a chemical barrier that effectively isolates the specimen from deleterious chemical interaction (as can take place in mechanical hot pressing). HIPing, however, does require that the specimen be sealed in some manner to prevent the pressure-transmitting fluid from penetrating into the pores. This can be accomplished either by encapsulating the specimen within a deformable inert container (made of glass or a soft inert metal), or by applying a limited amount of heat and/or pressure to the specimen surface (as for example by plasma discharge or hot forging) in such a manner as to seal the surface without causing significant consolidation within the volume of the material. Consolidation is then achieved by HIPing, which may be followed by an annealing cycle (as in hot pressing) to allow additional grain growth.

For LSO, one specific embodiment uses a hot forging technique (under vacuum at 1050 C) to seal the surface. This is followed by HIPing under a similar linear heating and pressurization cycle as cited for hot pressing, but to higher final pressures (30 kpsi) that enable consolidation at lower temperature (about 1250 C). This results in a finer and more uniform grain microstructure, enhancing the light transmission.

Optical Issues

For a scintillator to be useful for detection of ionizing radiation, light generated by interactions within the volume of the material must pass through it and emerge from the surface where it can be detected by photoelectric means. To prevent undue attenuation of the useful signal, the material will not exhibit significant optical absorption at the wavelength of the generated light. In most practical scintillator embodiments, it is rare for a total absorptive loss to exceed about 10%. Indeed, for most single crystal scintillators, such as LSO, the actual loss value is closer to 1%.

In ceramics, however, a second transparency-diminishing mechanism comes into play: scattering. This is caused by the presence along the intended light path of any surface or interface where a discontinuity occurs in the refractive index. In such a case, the laws of optics dictate that the light will be reflected or refracted in such a manner as to be diverted from the direction in which it had been traveling. Since this happens at every such interface, the total effect is critically dependent on the magnitude of the index discontinuity and the spatial density of the interfaces. Thus for most ceramics, where both of these quantities are large, a mathematically exact description of the light propagation quickly becomes impossible. The passage of light then behaves much like a diffusion process, amenable to description only as a complex statistical random-walk phenomenon.

Scattering is present in any material to some extent. Without being bound by any particular theory, we can identify a variety of physical sources for such scattering, such as foreign inclusions, voids or pores, structural lattice defects, density fluctuations, grain boundaries, etc. It is noted that, unlike absorption, scattering does not represent an actual loss of light, but rather a diversion from its original direction. In an extreme case all the light is redirected, to all angles. But since each scintillation event generates a large number of photons propagating in completely random directions, the presence of scattering merely superimposes another randomization process upon a system that is already random in the first place. In other words, in the absence of absorption, the presence of scattering should have no significant effect on the ultimate light signal that emerges from the specimen.

What scattering does cause, however, is a massive increase in the distance that a photon must travel before it emerges from the scintillator. What had been a short straight line from emitting center to surface is now transformed into a jagged and tortuous path that can be many orders of magnitude longer. And since real materials are never completely free of absorption, this massive increase in path length can magnify the effect of an otherwise negligible residue to such an extent that little if any light can escape. This is one of the reasons that microstructural control is significant in a ceramic scintillator: On geometric considerations alone, a doubling of the average grain size can reduce the mean optical path length by almost an order of magnitude.

It should be noted that no matter how efficient a scintillator is in generating light, the process whereby those photons are detected is inherently inefficient. Given the isotropic distribution of the emergent light, only a fraction of the generated photons are directed toward the detector. Consequently it is standard practice to emplace a reflective coating on all surfaces of the scintillator except the one facing the detector, so as to enable some of the misdirected photons to be reflected into the detector.

In this context (and contrary to conventional wisdom), it should be noted that in an actual instrument, transparency is not a primary requisite for a useful scintillator. Since the image is acquired by an array of individual scintillator pixels, each of which is embedded in a reflective coating, some degree of scattering is acceptable, as long as the mean path length is not increased to the point where the residual absorption constitutes a serious loss. Moreover, the associated photoelectric detector element is generally close enough and large enough to accept all of the light that emerges from the scintillator surface, whether scattered or not. The point to emphasize here is that single material parameters are not fully competent predictors of a scintillator's performance in any particular instrument or application. For this purpose, empirical comparison with an accepted standard is particularly useful.

Morphological Issues

While the optical properties of a ceramic scintillator are necessarily linked to its microscopic structure, the extent of this linkage is determined by an intrinsic material property, the indices of refraction. If the crystal structure is optically isotropic (cubic), the role of the microstructure becomes secondary; with only a single index of refraction, there can be no significant optical discontinuity across the grain boundaries to alter the path of photons, and therefore no scattering. Consequently, assuming the absence of trapped pores (void free) and foreign inclusions, the resulting ceramic is substantially transparent. One example of such a scintillator is $Eu^{3+}$-activated lutetium oxide ceramic.

At the other extreme are ceramics made from highly anisotropic crystalline materials. These have two or more refractive indices that differ by 10% or more. Here again the microstructure becomes largely irrelevant; unless a high degree of orientational control is imposed during the consolidation process, the index differences are not overcome by mere structural modifications.

A third type of ceramic consists of materials in the intermediate category, which can be termed mildly anisotropic. A typical example is alumina ($Al_2O_3$), used in arc lamp envelopes. Alumina is hexagonal and has two refractive indices that differ by 0.0053. This is the kind of situation where microstructural control can have significant impact on transparency. By suitable control of the grain size (<1 micron) alumina is made so transparent that a 1-mm thick slab will transmit over 50% of incident light at 645 nm wavelength.

LSO is another member of this third category. Although it has lower symmetry than alumina (monoclinic, $n_g$=1.825, $n_m$=1.802, $n_g$=1797) [G. V. Ananeva et al, translated from Izvestiya Akademiii Nauk SSSR, 17, 1037 (1981)] and a larger maximum index difference of 0.028, its parameters do not exclude a sufficient reduction of scattering to reach a comparable level of transparency. To our knowledge the indices of LPS are not known, but their spread might be smaller because the ceramics show a greater translucency. This is confirmed in FIG. 1, which shows partially transparent LSO and LPS ceramic specimens about 1 mm thick. The instant invention encompasses ceramics with such enhanced translucency.

Within the context of the preceding description, the degree of scattering in a ceramic is strongly dependent on the microstructure, and is amenable to modification through appropriate processing. Without being bound to any particular theory, attention is drawn to two ways that the light scattering of a ceramic can be reduced. One is to increase the average grain size, thereby reducing the number of refractive index discontinuities that a photon must cross during its passage through the material. In some embodiments it is also possible to impose a directional bias to the grain growth, causing some degree of orientational alignment of the grains. Such alignment further reduces the magnitude of the refractive index discontinuities and hence decreases light scatter.

An alternative way to reduce scatter is to form the ceramic under conditions such that the grains are smaller than the wavelength of light being transmitted (or scattered). Under such conditions, it is a general feature of the scattering phenomena to decrease with the size of the scatterer. In the instant invention, and in accord with minimizing scatter, grain sizes greater than about 20 $\mu$m or smaller than about 0.4 $\mu$m are particularly noted.

In both of these approaches, an important factor for minimizing scatter is the elimination of voids during the fabrication process. Without being bound by any particular theory, the presence of such defects is believed to have an inordinate impact on transparency because, despite the small volume that they occupy, the refractive index difference between them and the surrounding material is much larger than at any boundary between grains. Eliminating voids is significant in making high quality ceramics, and may be achieved by using higher pressures during the consolidation process and subsequent heat treatments for controlled grain growth. This has already been discussed in the section on ceramic fabrication.

It is noted that attention is not to transparency per se, but to minimize the average path that a photon must traverse to escape the scintillator. This directly determines the scintillation signal that becomes available to the photoelectric detector. As long as this signal has not suffered excessive attenuation by the residual absorption in the material, it is not dispositive if the source is clear or merely translucent.

An excellent example is the translucent $Gd_2O_2S$ (GOS) ceramic that is routinely used in some CT scanners (e.g., U.S. Pat. No. 6,392,239 to Maekawa et al). Since its performance has become an accepted benchmark, it is convenient for all measurements that bear on the applicability of the LSO or LPS ceramics as scintillators in practical imaging applications to be stated against GOS as a standard.

Figure 2:
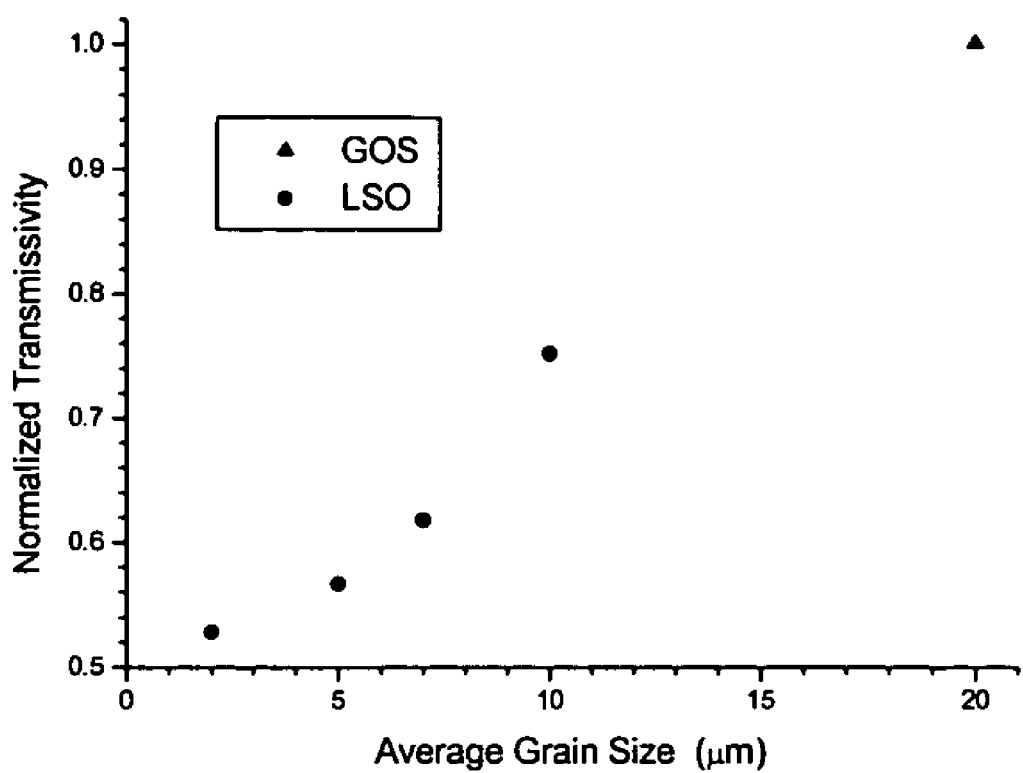
FIG. 2 is a graph of the transmission of 1-mm thick ceramics as function of grain size.
Figure 3:
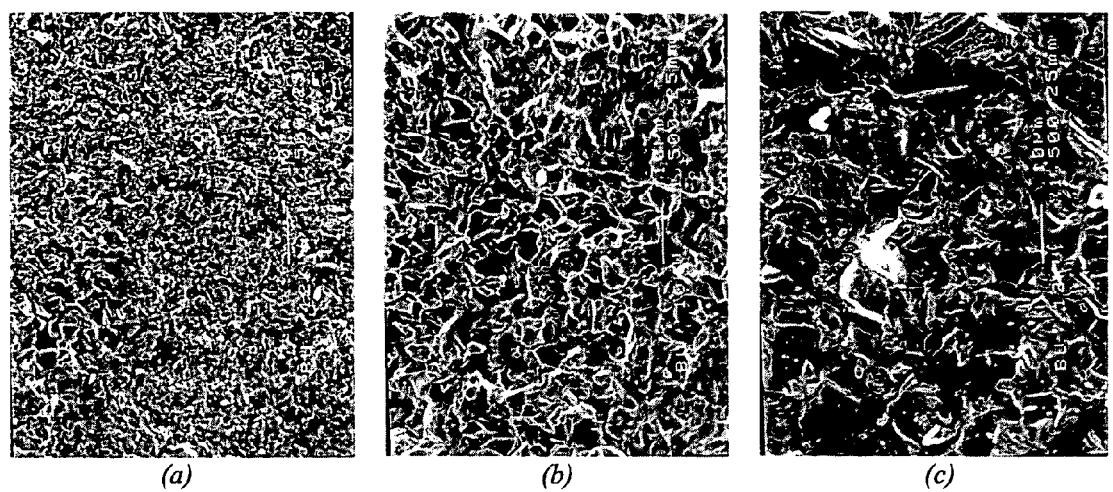
FIG. 3 contains SEM micrographs of the grain morphology of LSO ceramics after firing at 1500 C (a) and 1700 C (b). The average grain size in the first is about 2 μm, while in the second they have grown to 5–7 μm. As comparison, (c) shows the microstructure of GOS ceramic, whose grains exceed 20 μm.

FIG. 2 provides such a comparison of the transparency of various 1-mm thick ceramics as function of grain size. These values are proportional to $I/I_0$, and in the figure have been normalized to unity at the GOS value; thus the values are stated relative to GOS. It is noted that the transparency of the LSO ceramic increases with grain size. As is evident in FIG. 1, underlying text is readily perceived through the 1-mm thickness of the specimen, with greater clarity than through GOS at the same thickness. Corresponding SEM photographs of the microstructure are shown in FIG. 3. Similar results on LPS are also shown.

Emission Characteristics—Spectroscopy

Attention is drawn to the emission spectrum of the synthesized LSO ceramics. To examine the emission spectrum, specimens were excited with radiation from a Philips X-ray tube having a copper target, with power settings of 30 KVp and 15 mA. The resulting scintillation light was passed through a McPherson 0.2-meter monochromator and detected by an RCA C31034 photomultiplier tube with a quartz window. The system was calibrated with a standard light source to enable correction for sensitivity variations as a function of wavelength.

Figure 4:
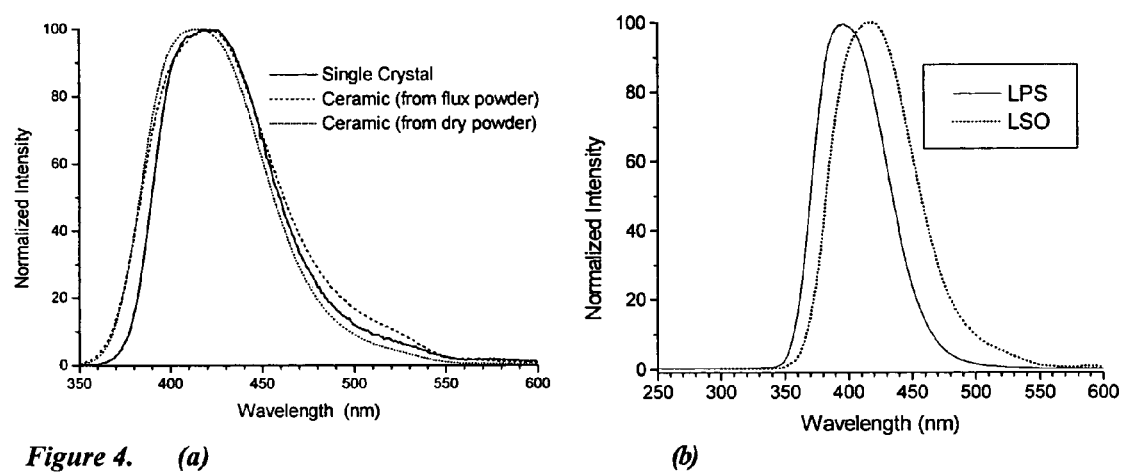
FIG. 4 contains two graphs of the X-ray excited emission spectra of lutetium silicate ceramics: (a) compares two LSO ceramics with the single crystal; (b) compares LSO ceramic with LPS ceramic.

FIG. 4 shows emission spectra for ceramics fabricated from the two different types of starting powder (prepared with and without flux), along with that from a LSO single crystal. In all three cases, the emission peak is at about 420 nm, which is characteristic for LSO, and the intensity scales have been normalized to this feature. It is noted that the spectra from the three specimens show quite similar structure. Neither the absolute intensities nor any of the details differ by more than about 10%, which is considered not to be statistically significant.

Emission Characteristics—Decay Profile

The temporal behavior of LSO scintillation was also compared. Depending upon the time scale to be investigated, different techniques were used. To cover the range of the fastest decay we used the photon correlation method (see Knoll G. F., 1989: Radiation Detection and Measurement, John Wiley & Sons, New York N.Y., USA). A $^{137}$Cs gamma source was used for excitation, and the random scintillation pulses were recorded on a multichannel analyzer. In this technique, the onset of each burst of light triggers the detector, which, with the aid of a time-to-amplitude converter, records the time-dependent intensity across its channels. The crystal has a radiative decay time of about 40 ns, while the initial decay of the ceramic is faster—about 20 ns. This difference is due to a small degree of quenching that is often found in prototype ceramics, which indicates a slightly lower light output than from the single crystal. It should be emphasized that short initial decay times such as these (in general<100 ns) are particularly important for positron emission tomography (PET), and render LSO the preferred scintillator for this application.

Figure 5:
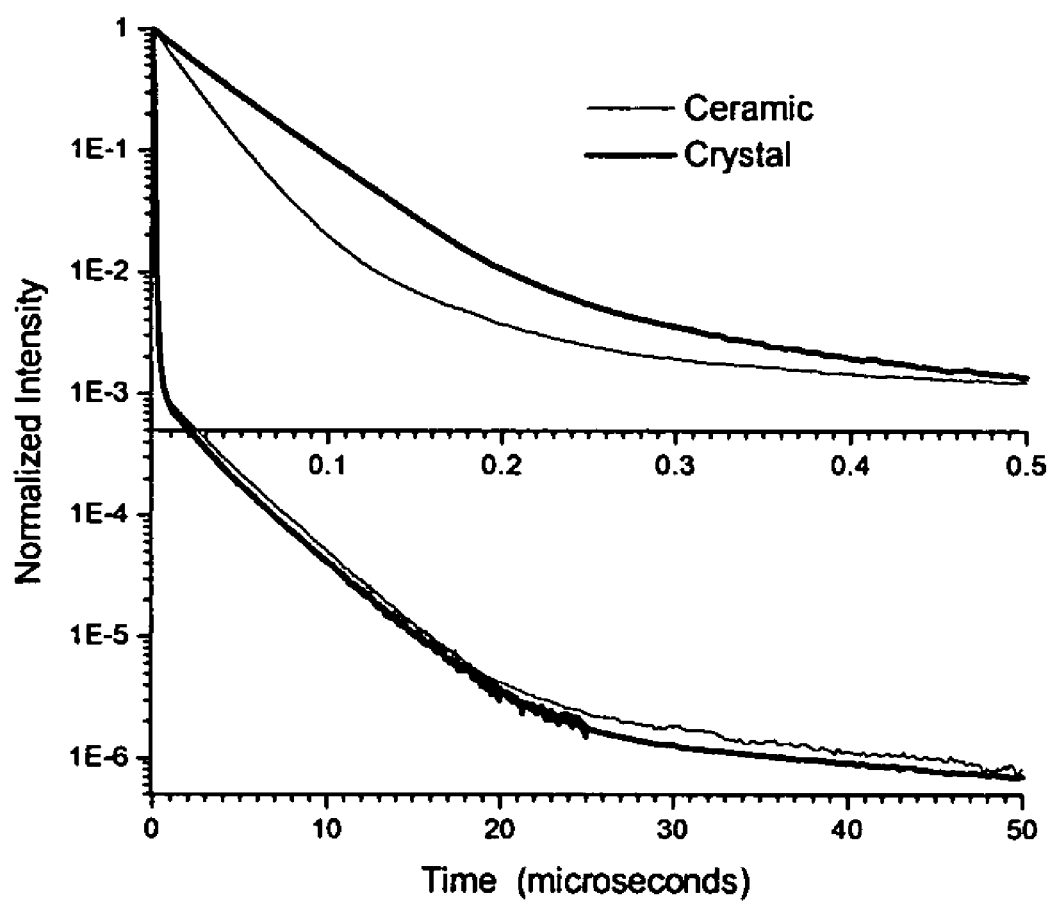
FIG. 5 is a graph of temporal decay of the emission from LSO ceramic and single crystal.

For measurements in longer time domains (microseconds and above), the LSO specimens were excited by a Golden Engineering Model XRS-3 pulsed X-ray source. The pulse consisted of X-rays of energies up to 300 keV with a duration of about 30 ns FWHM. The light was passed through a 0.2-m monochromator and detected with a Hamamatsu R2059 fast photomultiplier. The waveforms from 64 repeated pulses were stored and integrated on a Tektronix TDS220 storage oscilloscope. To enable coverage of the entire dynamic range of the light pulse, measurements were made over at least a half dozen sensitivity ranges defined by settings of the slit and the impedance of the PMT output, and are displayed on the bottom part of FIG. 5. The top part of the figure displays the same data on an expanded time scale, containing the initial (prompt) decay as measured by the photon correlation method. Following this initial decay is what we term an anomalous region characterized by a decay on the order of microseconds and extending several orders of magnitude in intensity. This decay, while substantially slower than in the initial region, is still considerably faster than the prompt decay of the fast scintillators ($CdWO_4$, GOS) now commonly used for CT. The presence of this anomalous rapid decay region extends the total useful emission range (i.e., before the onset of afterglow) to almost six orders of magnitude in only 20 $\mu$s, greatly enhancing the attractiveness of LSO for CT and other rapid imaging applications. As noted earlier, the traces from the polycrystalline ceramic of this invention and the single crystal were quite similar, with the only significant difference being in the prompt emission. In comparing two specimens of the same substance (for instance a single crystal and a ceramic), their light output over the initial period is proportional to the decay time. Hence the factor of two difference in decay constant between crystal and ceramic means that the latter would be expected to have a light output about half that of the crystal. This agrees well with a direct measurement of the light output by an entirely different technique, which will be discussed in a subsequent section.

Emission Characteristics—Persistence

Afterglow is a significant concern with scintillators used in CT applications. In the literature "afterglow" is a term that has been loosely applied to any portion of the scintillation decay that is slower than the initial rate that corresponds to purely radiative processes. In an ideal case, the fluorescence decay would be strictly exponential for any level of intensity accessible to measurement. This is very nearly the case with cadmium tungstate, whose emission does not depart from the exponential pattern for more than four orders of magnitude. At the opposite extreme are materials like thallium-doped CsI or cerium-doped YAG, whose decays fail to follow the exponential pattern, even from the very onset of the emission pulse. The vast majority of materials, of course, fall somewhere in between, with a modest range of exponential decay, followed by a growing departure from single exponential behavior that is generally attributed to the trapping and slow release of carriers at defects in the crystal lattice. And very rarely, as in LSO, there is more than one well-defined exponential region.

Figure 6:
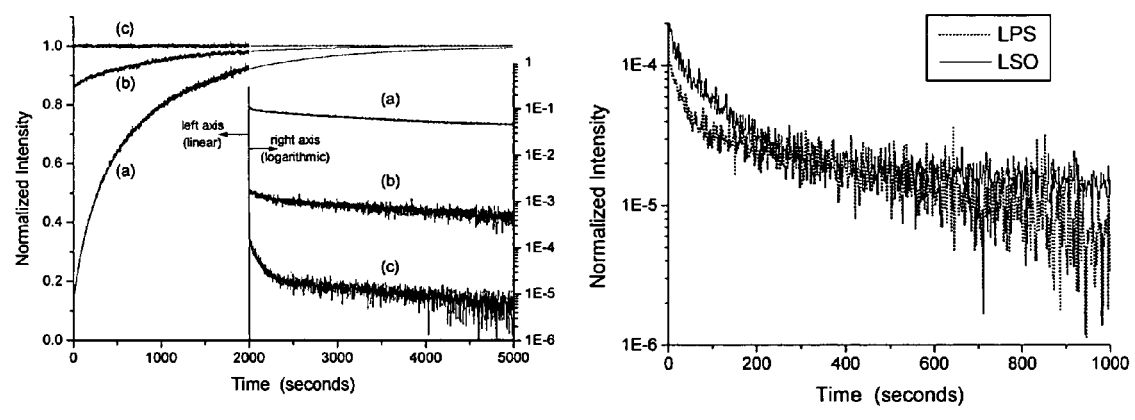
FIG. 6 contains graphs of the long-time effects on the emission of lutetium silicate ceramics: (a) compares LSO crystal and ceramic; (b) compares LSO ceramic with LPS ceramic.

Since the magnitude of persistent afterglow is directly dependent upon the number of carriers that have actually been trapped, it is best quantified by a different technique. This involves continuous irradiation of the scintillator for as many minutes as is necessary for the emission to reach a steady state level; this is depicted on the left side of FIG. 6. When a sufficiently steady level (at least 95% of asymptotic value) is reached, the irradiation is quickly cut off by a fast electromechanical shutter, while emission intensity is continuously monitored, as shown on the right side of FIG. 6. This depicts the long-term persistence of the emission of LSO crystal and ceramic. Note that crystal (a), designated "poor", shows a long slow buildup of the emission intensity under extended irradiation, as well as a high level of persistence after the irradiation is cut off. The "good" crystal (b) shows much less of both effects, while the ceramic specimen (c) shows the least of all. Dotted lines are extrapolations from analytical curve fit. The figure shows graphically the variation in long-term persistence that is encountered with LSO crystals, with differences of more than an order of magnitude, over a time scale not accessible by short pulse techniques.

Afterglow is undesirable on first principles, since it allows a scintillator to retain some memory of its previous exposure. Consequently, the extent to which it may be deleterious for a given application depends very strongly on the time rate of image acquisition. For CT use, a useful level of afterglow corresponds to a drop in the light signal by at least four orders of magnitude within 3 ms after the X-rays have been turned off. Although the 3 ms point cannot be resolved in FIG. 6 we see by backward extrapolation that only the ceramic fulfills that condition. While both of the crystal specimens fall short, the LSO ceramic of the instant invention exhibits a sufficiently low level of persistence to be useful in CT. On the basis of conventional wisdom, such a low level of persistence, less than from high-quality single crystals, is totally unexpected.

Scintillation Characteristics

The energy resolution of a scintillator is of particular relevance in PET applications. Without being bound by any particular theory, definition of the photopeak appears to be a function of the state of subdivision of the scintillating material. In some instances, when a crystal of a scintillator is ground into finer and finer powder, the photopeak becomes progressively weaker and broader, and ultimately disappears entirely.

Figure 7:
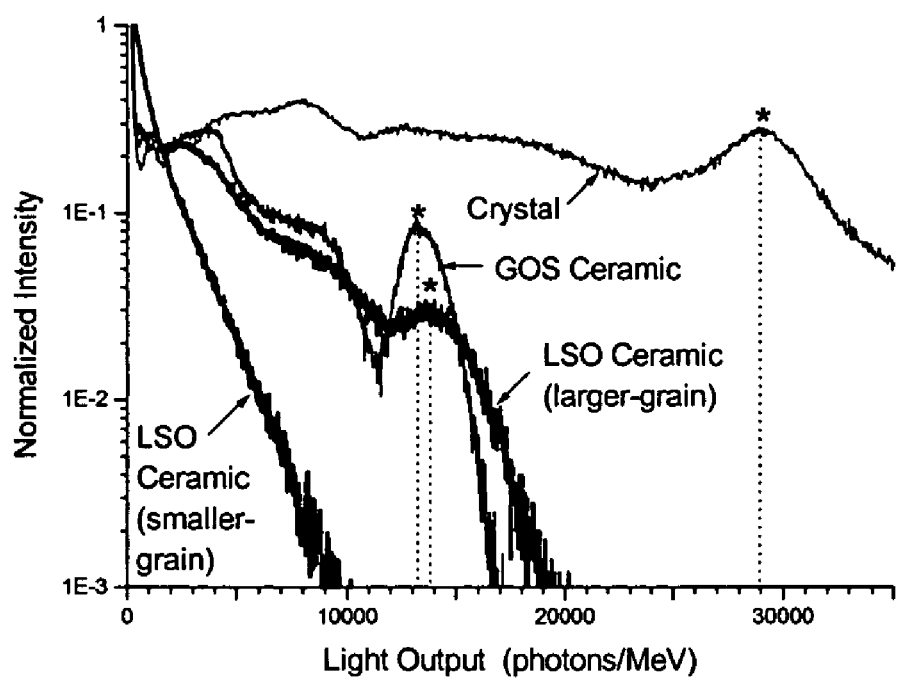
FIG. 7 is a graph of energy spectra of LSO crystal, LSO ceramics, and GOS ceramic.

A similar relationship holds for ceramics as well. As seen in FIG. 7, fine-grained (about 1 $\mu$m) LSO ceramic shows no trace of a photopeak, only a spectrum that falls off exponentially with channel number. In coarser-grained specimens of the same material, a photopeak emerges. GOS ceramic, in comparison, shows a photopeak that is much more prominent and well resolved. But even in the coarser-grained LSO ceramic the average size is less than half that of the GOS ceramic, demonstrating that a photopeak at least as well defined as that of GOS is obtainable in an LSO ceramic of equivalent grain size. In a scintillator, a narrow and well-developed photopeak (i.e., dominating the whole energy spectrum) is a clear indicator of good energy resolution.

Based on the photopeak position, the approximate light yield of an LSO ceramic can be assessed. In FIG. 7 the position is seen to be virtually the same as that from a commercial GOS ceramic and about half that from an LSO crystal, in agreement with the results of the decay measurements. Accordingly, this shows that the light output of the LSO ceramic is some 16000 photons per MeV, about the same as that of GOS. Thus the LSO ceramic is useful for the CT application. A second embodiment, for PET, has more stringent criteria, but well within the scope of this invention.

Another scintillation property is timing resolution. Like the energy resolution, this is of particular interest in connection with PET. In one embodiment, timing resolution is evaluated by placing two identical detectors on opposite sides of a $^{22}$Na source, which, through positron annihilation, emits two 511 kV gammas in opposite directions. The output from the two detectors is fed into constant fraction discriminators (CFDs) to reject transients and artifacts. The signal from the first serves as the start trigger of a time-to-amplitude (TAC) converter, while that from the second, after an appropriate delay, provides the stop signal. A statistical analysis of the channels in which the stop signal falls gives the precision of the coincidence measurement.

Figure 8:
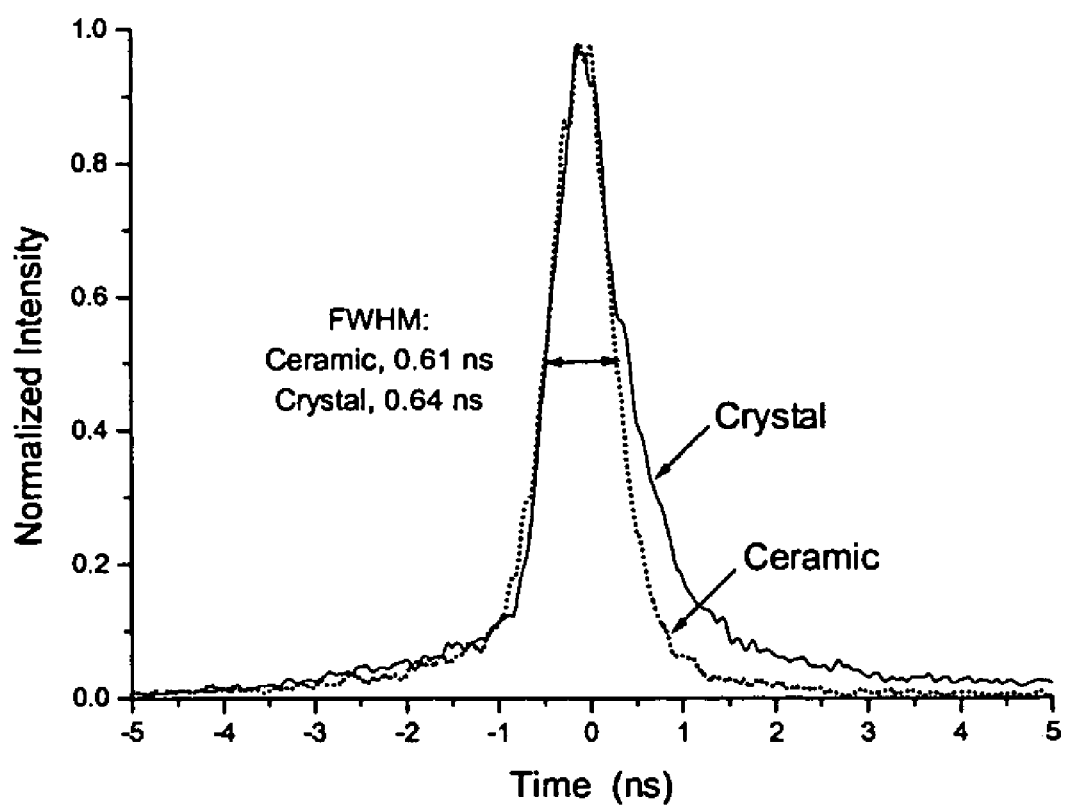
FIG. 8 is a graph of timing resolution of LSO crystal and ceramic.

FIG. 8 is a graph of timing resolution of LSO crystal and ceramic. As seen in the figure, the widths of the distributions for both ceramic and single crystal LSO are about 0.6 ns. Since most embodiments require start-to-stop times within five nanoseconds, the LSO ceramic is well within acceptable range for PET applications.

REFERENCES

Note is made of the following, the teachings of which are incorporated herein by reference:
1. D. G. Anderson, J. Dracass, and T. P. Flanagan, *Proc. 5th Intl. Instrum. & Meas. Conf., Stockholm* 66 (1960).
2. A. D. Bross, *Nucl. Instr. &Meth.* A247, 319–326 (1986).
3. W. W. Moses and S. E. Derenzo, *Proc. Intl. Conf. on Inorganic Scintillators, SCINT95* (Delft University Press, the Netherlands, 1996).
4. W. W. Moses and S. E. Derenzo, *Proc. Intl. Conf. on Inorganic Scintillators, SCINT95* (Delft University Press, the Netherlands, 1996).
5. U.S. Pat. No. 5,484,750 to Greskovich et al., "Transparent polycrystalline garnets."
6. U.S. Pat. No. 4,883,956 to Melcher et al., "Methods and apparatus for gamma-ray detection spectroscopy and like measurements."
7. U.S. Pat. No. 5,562,860 to Grabmaier et al., "Phosphor having reduced afterglow."
8. U.S. Pat. No. 4,958,080 to Melcher et al., "Lutetium orthosilicate single crystal scintillation detector."
9. U.S. Pat. No. 5,296,163 to Leppert et al., "Methods for producing a scintillator ceramic."
10. C. Melcher et al., "Scintillation Properties of LSO:Ce Boules," *IEEE Trans. Nucl. Sci* 17, 965–968 (2000).
11. C. Melcher et al., "Advances in the Scintillation Performance of LSO:Ce Single Crystals,"*IEEE Trans. Nucl. Sci Symposium and Medical Imaging Conf,* 17:965–968 (November 2002).
12. Y. Ito, H. Yamada, M. Yoshida, H. Fujii, G. Toda, H. Takeuchi, and Y. Tsukuda, *Jpn. J. Appl. Phys.* 27, L1371–L1373 (1988).

What is claimed is:

1. A polycrystalline Lu silicate scintillator doped with a Lanthanide rare earth.

2. The scintillator of claim 1 where the polycrystalline material is in the form of a ceramic.

3. The scintillator of claim 1 where the concentration of the Lanthanide rare earth dopant is in the range of about 0.01 mole % to about 5 mole % relative to lutetium.

4. The scintillator of claim 1 where the Lanthanide rare earth dopant is Cerium.

5. The scintillator of claim 2 where the density of the ceramic is higher than about 95% of the density of a single crystal of Lu silicate.

6. The scintillator of claim 1 where the Lu silicate is Lu2SiO5 ("LSO").

7. The scintillator of claim 1 where the Lu silicate is Lu2Si2O7 ("LPS").

8. A ceramic LSO scintillator doped with Cerium.

9. A ceramic LPS scintillator doped with Cerium.

10. The ceramic scintillator of claim 2 prepared by the process of consolidating a powder having the same chemical composition as in the single crystal Lu silicate:Ce scintillator.

11. The ceramic scintillator of claim 10 where consolidating comprises sintering in vacuum or an inert atmosphere, at temperatures between about 10° C. and about 300° C. below the melting point of the Lu silicate.

12. The ceramic scintillator of claim 11 further comprising a heating rate value of between about 10° C. and about 20° C. per minute.

13. The ceramic scintillator of claim 10 where the consolidating further comprises imposing mechanically generated uniaxial pressure.

14. The ceramic scintillator of claim 13 wherein said uniaxial pressure has a value of between about 5000 and about 10000 psi.

15. The ceramic scintillator of claim 13 wherein said uniaxial pressure is applied at temperatures of about 900° C. or higher.

16. The ceramic scintillator of claim 10 where consolidating further comprises imposing isostatic pressure said pressure transmitted by an inert pressurized fluid.

17. The ceramic scintillator of claim 16 wherein said pressure is at a value between about 1,000 and about 50,000 psi.

18. The ceramic scintillator of claim 17 wherein the isostatic pressure is applied at temperatures of between about 200° C. and about 1200° C. below the melting point of Lu silicate.

19. The ceramic scintillator of claim 10 further comprising processing after consolidation wherein the ceramic is heated in air.

20. The ceramic scintillator of claim 19 where heating is between about 800° C. and about 1500° C.

21. The ceramic scintillator of claim 20, where the heating is applied for about one hour.

22. A method for fabricating a scintillation material of polycrystalline Lu silicate scintillator doped with a Lanthanide rare earth, the method comprising the steps of consolidating a powder having the same chemical composition as in a single crystal Lu silicate:Ce scintillator by:
   sintering said powder in vacuum or an inert atmosphere, at temperatures between about 10° C. and 300° C. below the melting point of the Lu silicate;
   applying a mechanically generated uniaxial pressure of a value between about 1,000 and about 50,000 psi; and,
   heating the resulting material in air at a temperature between about 800° C. and about 1500° C. for about 1 hour.

23. A method for fabricating a scintillation material of polycrystalline Lu silicate scintillator doped with a Lanthanide rare earth, the method comprising the steps of consolidating a powder having the same chemical composition as in a single crystal Lu silicate:Ce scintillator,
   sintering said consolidated powder in vacuum or an inert atmosphere, at temperatures of between about 200° C. and about 1200° C. below the melting point of Lu silicate;
   applying to said sintered material an isostatic pressure as transmitted by an inert pressurized fluid of a value between about 1,000 and about 50,000 psi; and,
   heating is the resulting ceramic in air at a temperature between about 800° C. and about 1500° C. for about 1 hour.

24. The scintillator of claim 1 having transparency to electromagnetic radiation of a wavelength of 420 nm.

25. The scintillator of claim 1 where the grain size of the scintillator is greater than about 5 µm.

26. The scintillator of claim 1 where the grain size of the scintillator is smaller than about 0.8 µm.

27. The scintillator of claim 1 wherein for a 1 mm thickness, under excitation by 150 kVp X-rays, the amount of 420 nm wavelength electromagnetic radiation emerging from the scintillator is at least about 50% of that emerging from a specimen of Gd2O2S:Pr ceramic of the same dimensions.

28. The scintillator of claim 1 wherein for a 1 cm thickness, under excitation by 511 keV gamma rays, the amount of 420 nm wavelength electromagnetic radiation emerging from the scintillator is at least about 50% of that emerging from a specimen of LSO:Ce single crystal of the same dimensions.

* * * * *